United States Patent
Berntsen et al.

(10) Patent No.: US 8,223,073 B2
(45) Date of Patent: Jul. 17, 2012

(54) APPARATUS AND METHOD FOR A DIRECTIONAL FINDER

(75) Inventors: James Ladd Berntsen, Ramona, CA (US); Patrick Edward Franz, San Diego, CA (US); Bruce Hampton Kennard, San Diego, CA (US); Rob Baranowski, San Diego, CA (US); Ian Crabtree, San Diego, CA (US)

(73) Assignee: Compass Auto Tracker LLC, Poway, CA (US)

( * ) Notice: Subject to any disclaimer, the term of this patent is extended or adjusted under 35 U.S.C. 154(b) by 0 days.

(21) Appl. No.: 12/528,797

(22) PCT Filed: Mar. 12, 2008

(86) PCT No.: PCT/US2008/056665
§ 371 (c)(1),
(2), (4) Date: Feb. 2, 2011

(87) PCT Pub. No.: WO2008/112765
PCT Pub. Date: Sep. 18, 2008

(65) Prior Publication Data
US 2011/0133987 A1     Jun. 9, 2011

(51) Int. Cl.
*G01S 5/04* (2006.01)
(52) U.S. Cl. ...................................................... 342/432
(58) Field of Classification Search .................. 342/413, 342/417, 430–437
See application file for complete search history.

(56) References Cited

U.S. PATENT DOCUMENTS

| | | | | |
|---|---|---|---|---|
| 5,250,955 A | * | 10/1993 | Major et al. | 342/457 |
| 2005/0032531 A1 | * | 2/2005 | Gong et al. | 455/456.5 |
| 2010/0330940 A1 | * | 12/2010 | Sheynblat et al. | 455/129 |

* cited by examiner

*Primary Examiner* — Thomas Tarcza
*Assistant Examiner* — Nga X Nguyen
(74) *Attorney, Agent, or Firm* — Marcus C. Dawes; Daniel L. Dawes (57) ABSTRACT

The invention provides a determination of direction to a remote object which omnidirectionally transmits a signal. The invention includes a handheld directional and omnidirectional antenna at a user's location and a handheld circuit coupled to the antennas to determine field strengths of the signal received from the remote object by the two antennas. A comparison of the received signals at the antennas during a sweep a field of observation is made and a probable direction of the remote object relative to the user's location is selected from the data sweep. The apparatus may further comprise a digital compass which generates a compass heading corresponding to each direction in which the directional antenna is pointed. The circuit stores field strength data by compass heading and averages the field strength data according to a predetermined protocol over compass headings.

37 Claims, 4 Drawing Sheets

APPARATUS AND METHOD FOR A DIRECTIONAL FINDER

BACKGROUND OF THE INVENTION

1. Field of the Invention

The invention relates to the field of apparatus and methods to detect and report the direction of objects, and more particularly to a method and circuit for identifying the location of an automobile.

2. Description of the Prior Art

It is well known to use signal strength and a directional antenna as a low cost embodiment for a direction finder targeted towards consumer markets. The better the directionality of the antenna, the better the accuracy in finding the remote object or for example the parked automobile. However, consumer devices place a high premium on smaller size, and directionality becomes harder to achieve the smaller the antenna elements become. Also, as the size of the antenna element decreases as compared to the wavelength of the received signal, local nulls due to multipaths and reflections begin to influence and disrupt the direction-finding ability of the directional antenna. Therefore, what is needed is a directional antenna that is small in size, yet is not influenced nor negatively affected by reflections and multipaths.

BRIEF SUMMARY OF THE INVENTION

It is one object of the present invention to provide a means for using a directional antenna that is small relative to the wavelength of the received signal that is not adversely affected by reflections and multipaths. To achieve these stated and other objects, the present invention may be embodied as a complex antenna element that combines a directional antenna element and an omnidirectional element or an approximately omnidirectional element. It must be understood that perfect omnidirectionally of an element is rarely if ever achievable. Therefore, throughout this specification and claims the use of the term "omnidirectional" shall be understood as a relative term used in comparison to the directional antenna element with which it is combined. Therefore, the statement that the present invention may be embodied as a complex antenna element that combines a directional antenna element and an omnidirectional element can be understood to include the situation where the present invention is embodied as a complex antenna element that combines a directional antenna element and an element that is relatively nondirectional when compared to the directionality of the directional antenna element. The degree of relative nondirectionality of the omnidirectional element can be understood according to the efficacy of the invention to reliably determine direction. In an embodiment described below, the second element simply has a different gain pattern and may in fact be more directional in various aspects than the first element. The combination of these antenna elements and the strength of the signal that each of the antenna elements receives results in an embodiment that is not negatively impacted by the local nulls that are a result of reflections and multipaths.

In the method using the directional antenna embodiment, a direction-finding device begins a radiofrequency communication with a remote object whose whereabouts or relative direction is not known. Radio communication continues between the units to allow the unit with the directional antenna to continuously measure received signal strength as the relative direction of the direction-finding device is varied by reporting the relative signal strength to a user.

The preferred embodiment includes a directional antenna and an omnidirectional antenna in the direction-finding device and an omnidirectional antenna in or on the remote object or automobile, but these elements may be interchanged as variations of the same basic embodiment. If the antennas are switched, then either the received signal strength indicator (RSSI) data or the directional information is transmitted from the remote object to the direction-finding device.

A directional antenna by itself can only rely upon received signal strength to determine the direction of a remote object or transmitter. The preferred algorithm used in the method reports direction of the remote object when the signal strength received by the direction antenna is at its maximum. The indication of direction and maximal signal may be provided in the form of visual cues, audible cues, tactile cues such as a vibrator or a direction indication on the user display of the direction-finding device. The present embodiment combines the combination of visual and audible feedback when the direction-finding device is pointed at the remote object.

For the direction-finding device to correctly report the direction of the remote object, the device must be able to sample the received signal strength for the condition of the device being pointed in the correct as well as the incorrect directions. This gives the algorithm running in the device the ability to compare received signal strengths when pointed at the object to other signal strengths when pointed away from the object, and reporting when the received signal strength is at a relative maximum.

In an environment with no reflections, simply indicating the direction of the target when signal strength received by a directional antenna is at its relative maximum provides a reliable and dependable method of finding a remote object. However, in a reflective and multipath environment more typical of actual environments such as in an automobile parking lot, radio frequencies travel in many different directions and follow many different paths on the way to and from the remote object and the finding device. These different paths create standing waves, local peaks and nulls that confuse any direction-determining algorithms that are based only upon received signal strength and a directional antenna.

Consider the simple case of a remote object transmitting a radio frequency signal that has one direct path to a direction-finding device and one reflected path to the direction-finding device. The direct path will reach the direction-finding device first, followed by some delay in time before the arrival of the reflected signal. Depending on the delay between the two received signals, the second signal may be received in-phase with the original signal, out of phase with the original signal, or anywhere in between. The phase relationship between the first and second received signal is consistent for that particular location, but it is easy to demonstrate that the phase relationship will change as the direction-finding device is moved through space. For example, if the detection-finding device is moved to a location that makes the reflected path shorter while keeping the direct path length the same, the phase difference between the two signals will decrease. Extending this reasoning and considering that in-phase signals sum while out of phase signals cancel, it is clear to see that the received signal strength of the radio frequency carrier can increase or decrease as the direction finding device is moved around in space, as it is moved through local nulls and local peaks.

In the real world multipath transmissions can and do occur because there are multiple objects in the transmission path which reflect or block the transmission between any two given points. Further, the orientation of the transceiver antenna is variable according to the angular orientation in space and the spatial point at which the transceiver may be held by the user. This may also affect the direction of polarization in space of the electromagnetic wave which is transmitted which may have an effect at the receiver unit or its propagation.

Local nulls can be thought of as locations where the received signals are out of phase, and local peaks are where the received signals are in phase. As the size of the directional antenna becomes small in regards to the wavelength of the carrier frequency, it also becomes small in regards to the size of the local peaks and nulls. If an antenna element is large enough to receive the radio frequency energy across a peak and a null, it will not see signal strength variations due to the peaks and nulls. But as the antenna gets small enough to physically fit within the space of a null and not overlap into any adjacent peaks, received signal strength becomes significantly affected by the local null. The basic problem in this scenario is that the received signal strength can drop because the direction-finding device has been moved into a null rather than being pointed away from the remote object at the moment. Without having any other information, algorithms that rely on received signal strength cannot accurately detect whether it is being pointed towards a remote object, or if it is in a local peak or null.

The present invention introduces an omnidirectional element to determine if the direction-finding device is currently in a local peak or null. Consider the case of moving the direction-finding device into a local null while still being pointed towards the remote object. The received signal strength of the directional antenna will decrease as the null is entered. At the same time, the received signal strength of the omnidirectional antenna will also decrease a comparable amount. This is because both antennas physically detect the same null. The difference between the signal strengths separately received by the omnidirectional and directional antenna elements will remain constant.

The object of the present invention is to constantly compare the received signal strength of the directional and omnidirectional antennas to determine direction. When the signal received by the directional antenna is stronger than the signal received by the omnidirectional antenna, the direction-finding device is considered as pointed towards the remote object, regardless of its position relative to a local peak or null. Similarly, when the signal received by the directional antenna is less than the signal received by the omnidirectional antenna, the direction-finding device is considered as pointed away from the remote object, regardless of its relative position relative to a local peak or null. The omnidirectional antenna will measure directly radiated and all reflected waves from the target. For any given location of the direction finder, this omnidirectional signal is necessarily constant regardless of the direction in which the direction finder may be pointed. Directly radiated and reflected signals in the direction to which the directional antenna is pointed will vary widely depending on the radio environment, but will tend to be maximal in the direction of the target.

The invention also includes an embodiment where the second antenna is not necessarily omnidirectional, but simply an antenna with a radiation pattern different than the first directional antenna. For example, consider the second antenna having a pattern that is horizontally elliptical. The algorithm, approach, and description within this specification still holds in such a case. The gain pattern of the second antenna, if known, can thus be included in the algorithm and appropriate compensation for it made in the determination of direction. Thus, it must be understood that the second antenna may have any gain pattern and an omnidirectional antenna is described only for the purposes of example in the illustrated embodiment.

Specific calculations and algorithms to determine directionality from the signal strengths received by the two antennas are embodiments of the present invention, even though they may be varied in their detail based upon performance characteristics of particular antenna elements.

One embodiment of the invention calls out two particular devices when referring to the direction-finding and object locating system. The remote object is typically a transceiver that is usually attached to an object that is usually in need of being found or located, such as an automobile, pet or a child. It typically has a single antenna and the amount of software processing and user indication are minimal. The direction-finding device is typically used by the user to locate the object, pet or person to which the remote object is attached. The direction-finding device typically is more complex in that it has the two-antenna configuration, direction processing software, and a user indication to provide feedback to the user showing the direction of the remote object. It is part of the illustrated embodiment of the invention that the technologies used to implement this two-piece system can be combined or reorganized to produce other combinations based on users' needs for the technology. For example, if paired together, a direction-finding device could be configured to find another direction-finding device. This would require both devices used in the system to each have the antenna pairs and direction-finding software so that either device could find the other at any given time. In addition, the direction-finding device that is being located might provide an indication to its user that the location finding process is in progress, or could provide an option to the user to cancel or block the direction-finding if the location of the user needs to be kept secure.

In another embodiment the method uses the characteristics of the primary and reflected paths, direction of the direction-finding device, and averaging to determine the direction of the primary path and filter out any and all reflected paths. When using a highly directional antenna pointed at a remote object, received signal strength is at its maximum. As the direction of the directional-finding device is varied slightly left to right, the received signal strength rolls off at a moderate rate. On the other hand, when the directional-finding device is pointed at a reflected signal, tendency is that received signal strength rolls off very quickly as the directional-finding device is angularly varied, e.g. slightly left to right. This difference in roll off rates can be used to distinguish between true directions based on directly received signals and false directions based on reflections.

In the preferred embodiment, the orientation or relative heading of the directional-finding device is determined by a referencing subsystem, such as a digital compass, that determines orientation relative to the earth's magnetic field. The digital compass, after being conditioned through software, outputs a heading which represents the direction towards which the directional-finding device is pointed. MEMS gyroscopes can be readily substituted for a digital compass or included within the definition of the same. The preferred embodiment takes signal strength readings for each heading and averages them across all headings. Averages are computed for each heading by summing the measured signal strength for that heading plus the readings from the two headings to the left and the two readings on the right. Heading steps, number of headings in the averages, and incorporation of time averaging can be optimized for each embodiment, and the adjustments to this averaging made according to conventional design principles consistent with the teachings of the invention. The result of this averaging method produces a signal strength peak centered around the heading pointing towards the remote object.

For the direction-finding device to correctly report being pointed toward the remote object, the device must be able to sample the received signal strength for directions pointed toward and away from the object. This gives the algorithm running in the device the ability to compare received signal strengths when pointed at the object to other signal strengths, and report when the received signal strength is at a relative maximum. The process of collecting received signal strengths while the directional finding device is pointed towards and away from the remote object is referred to as the "sweep." This sweep is done at the beginning of each directional-finding process, and is implemented with the user swinging the directional-finding device back and forth to sample receive signal strengths at many angles, i.e. to sweep the field.

In addition to averaging received signal strength over angle, the digital compass in the preferred embodiment allows for a more complete scan of signal strength than without it. Without a digital compass as in the preferred embodiment, the sweep software is not aware of headings during a sweep, so it can only store the range of signal strengths received over a period of time, not knowing if the sweep has even covered enough angles to be effective. However, with the digital compass and the knowledge of the compass headings during the sweep, received signal strengths can be stored in bins labeled by the corresponding headings and direction determinations made only when the sweep has met predetermined angular ranges or other statistical measures well known to the art.

Also, the directional-finding device can remain in sweep mode until it has collected enough signal strength information over various direction angles to accurately detect the direction of the remote object, instead of simply staying in sweep mode for a fixed period of time. With the illustrated embodiment of the present invention, an indication can be given to the user that shows sweep mode is still active, encouraging the user to continue to sweep over a larger number of angles before directionality is reported.

A further enhancement to the preferred embodiment is to indicate to the user the left-right direction the directional-finding device should be moved to be pointed directly at the remote object. Once the directional-finding device has determined the direction of the remote object by sensing the strongest signal strength, it can store the heading of the remote object. Then as the directional-finding device is moved left and right, the software in the device can compare the stored heading to the current heading and provide the user feedback as to which direction the directional-finding device needs to be moved to be pointed directly at the remote object.

The illustrated embodiment of the invention is described for locating automobiles within a parking area, but it is to be expressly understood that the teachings of this invention can be used to locate any object that is within a relative proximity to someone looking for that object.

For example, the direction-finding device could be used to locate a remote object that is fixed on a child, so that the parents can use the direction-finding device to locate the child as long as the child is within the range of the devices.

The remote object could be located on other items such as remote controls, key chains, pet collars, and garage door openers so that the direction-finding device could be used to find these objects when lost or when they may have wandered off.

The remote object can also be put in a camper, campsite, boat, ATV, or other locations that may serve as a findable location while participating in outdoor activities.

As described above two direction-finding devices could be configured to be able to locate each other. This would allow campers, hikers, bikers, and any other couples or groups to locate each other when separated. The group size is only limited by software and how the device pairings are made.

Direction-finding devices can also be configured to locate points of interest or amenities within areas frequented by users. Locating these other common amenities may be activated by a second button on the direction-finding device. For example, a user may park his/her vehicle in a large parking structure, then activate the second button on the direction-finding device to locate the nearest staircase or elevator. This is achieved by the parking structure management placing a remote object with a public access key at each of the staircases and elevators. These remote objects will communicate with any direction-finding devices that have entered public-access mode.

While the apparatus and method has or will be described for the sake of grammatical fluidity with functional explanations, it is to be expressly understood that the claims, unless expressly formulated under 35 USC 112,are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112 are to be accorded full statutory equivalents under 35 USC 112. The invention can be better visualized by turning now to the following drawings wherein like elements are referenced by like numerals.

The invention and its various embodiments can now be better understood by turning to the following detailed description of the preferred embodiments which are presented as illustrated examples of the invention defined in the claims. It is expressly understood that the invention as defined by the claims may be broader than the illustrated embodiments described below.

DETAILED DESCRIPTION OF THE PREFERRED EMBODIMENTS

The illustrated embodiment of the invention is comprised of a remote object 200 such as a device located in a parked automobile, a directional finding device 100, and a radio frequency link 301 between object 200 and device 100. While the illustrated embodiment is in some instances stated as directed to finding a parked automobile, it must be understood that the invention is neither limited to automobiles nor to fixed objects. Objects should be understood here in a broad sense to include both any kind of animate or inanimate object. Hence, the invention can be applied with equal validity to pets, children, keys, bicycles, motorcycles, automobiles and anything whose position would be sought. The application for finding a parked automobile is advantageous in that precise direction determination is not necessary, but only sufficient directionality to lead the user close enough to the auto that visual identification can readily be made. Such an application allows substantial errors in the indicated angle without any diminishment of the utility, since direction accurate within tens of degrees is often sufficiently accurate. As shown in the block diagram of FIG. 1 device 100 in the illustrated embodiment is comprised of a directional antenna 101 and an omnidirectional antenna 102. Antennas 101 and 102 are coupled to an RF switch 103 which is controlled by controller and processor 106. Controller and processor 106 may be comprised of a microprocessor, a digital signal processor, digital logic circuitry or analog control circuitry and radio frequency control and processing circuits devised according to conventional design principles to implement the functions taught by the illustrated embodiment of the invention. Controller and processor 106 may also include one or many user input devices, which could be embodied with buttons or similar input methods. These buttons may be used to start or stop a direction-reporting sequence, to select a remote object that is being searched for, or to allow or cancel another direction-finding device which is trying to locate the subject device.

Figure 1:
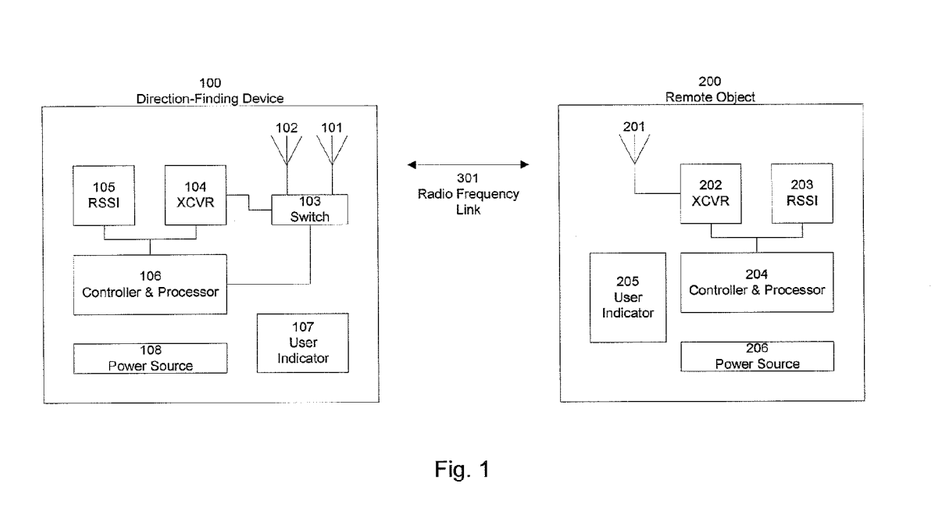
FIG. 1 is a block diagram of the circuitry in the direction finder and remote object according to the preferred embodiment of the present invention.

In the embodiment where a direction-finding device is seeking to locate another direction-finding device, remote object 200 would be replaced by a second instantiation of direction-finding device 100, communicating over radio frequency link 301.

Figure 2:
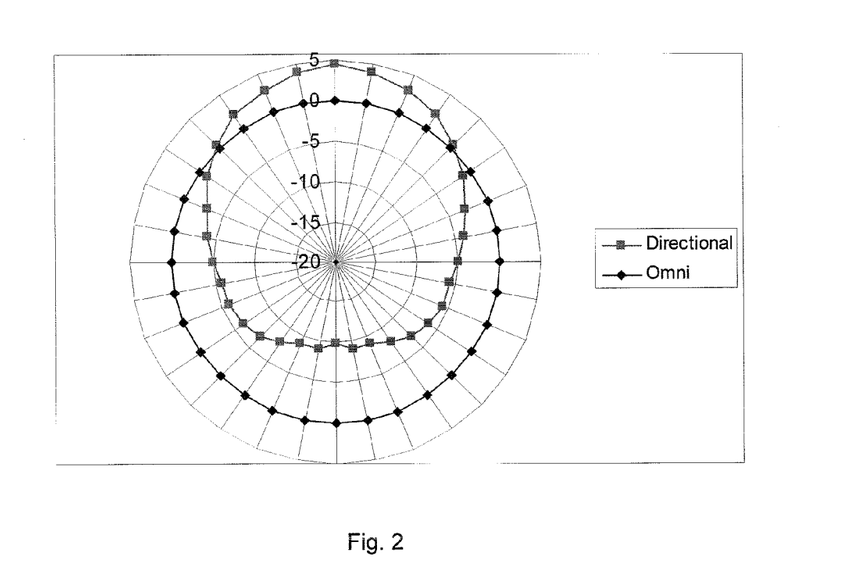
FIG. 2 is a polar graph of the radiation patterns of the directional and omnidirectional antenna elements within the illustrated embodiment.

FIG. 2 is a polar graph showing the relative gain pattern in db for directional antenna 101 shown by the square data points and omnidirectional antennas 102 and 201 shown by the diamond data points. The gain of the omnidirectional antenna 102 is taken as the 0 db reference. As shown in FIG. 2 the back lobe of directional antenna 101 is reduced by at least −10 db and the front lobe increased by at least 5 db compared to the omnidirectional gain. The polar graph is divided into 32 equal angular segments of 11.25° each so that it can be seen that the directional antennas' gain does not equal the omnidirectional antenna's gain until the forward ±45° sector is reached. It must be understood that the antenna pattern is shown only by way of example and that the performance and gain patterns will vary depending on the specific antenna designs chosen, which are not to be limited by the example given.

Alternatively, it should be pointed out that any nonuniform or non-omnidirectional antenna pattern can be employed by this invention for the purposes of determining direction. Additionally, the omnidirectional antenna does not necessarily need to be truly omnidirectional to satisfy the requirements of this invention. The fundamental requirement is that the relative received signal strengths between the two antennas must be unique in the direction of the remote object. Whether the difference between the antennas is at a relative minimum, maximum, or whether one antenna is receiving stronger or weaker signals than the other doesn't matter, as long as the combination is unique.

Figure 3:
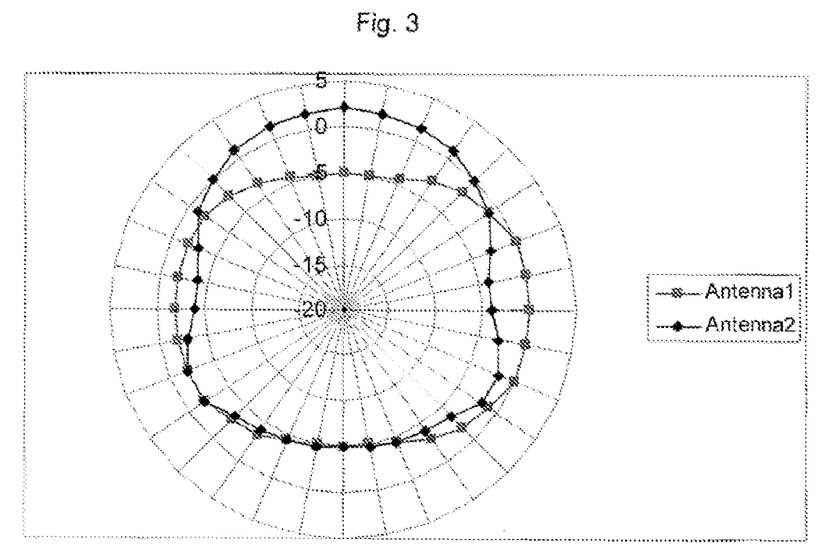
FIG. 3 is a polar graph of the radiation patterns of two non-uniformly directional antenna elements including one which in the illustrated embodiment is essentially horizontally elliptical.

FIG. 3 shows an example of two non-uniform directional antenna elements that can be used to embody the present invention. In this example, antenna 2 has a peak in the direction towards the remote object, and the pattern of antenna 1 is not uniformly omnidirectional. The direction of the remote object is the one where the signal strength received by antenna 2 exceeds the signal strength received by antenna 1 by the greatest margin. The task of the software running in the direction-finding device is to identify the direction where the signal strength received by antenna 2 most exceeds that received by antenna 1.

This unique difference in relative signal strength allows many more possibilities when it comes to antenna implementation. For example, the directional antenna does not necessarily need to have a lobe in the desired direction; it could have a null instead. The null would make the directional antenna's signal much weaker in the desired direction than the omnidirectional's signal, still making direction-finding possible. It is then up to the software within the device apply the correct algorithm, looking for either a peak or a null, to determine direction.

Figure 4:
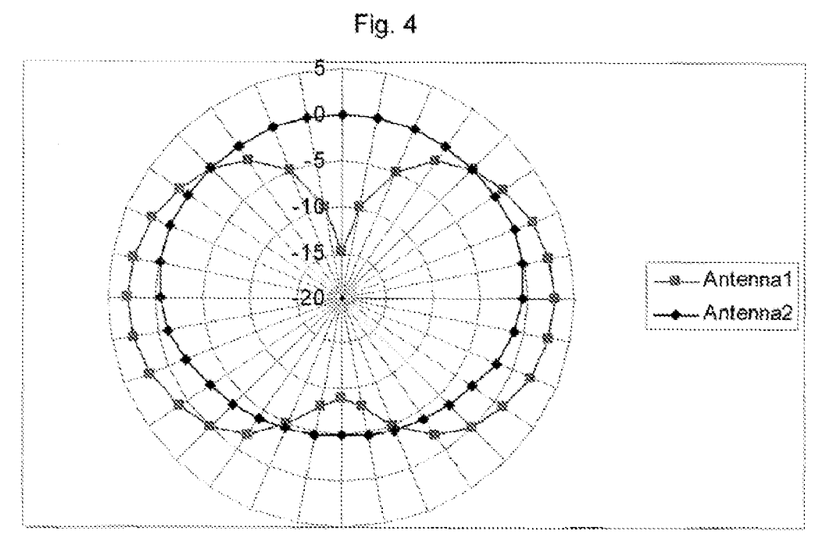
FIG. 4 is a polar graph of the radiation patterns of two non-uniformly directional antenna elements where the directional antenna uses a null in the desired direction rather than a peak in the desired direction.

FIG. 4 shows another example of two non-uniform directional antenna elements that can be used to embody the present invention. In this example, antenna 1 has a null in the direction towards the remote object, and the pattern of antenna 2 is slightly biased towards the remote object. The direction of the remote object is the one where the signal strength received by antenna 2 exceeds the signal strength received by antenna 1 by the greatest margin. The task of the software running in the direction-finding device is to identify the direction where the signal strength received by antenna 2 most exceeds that received by antenna 1, or the direction where the signal strength received by antenna 1 is at a minimum relative to that received by antenna 2.

Referring to FIG. 1, Switch 103 is coupled to a radio transceiver 104 to detect the incoming signals. In addition, command signals may be generated by controller 106 and transmitted via transceiver 104 through omnidirectional antenna 102 or antenna 101 to send commands to remote object 200, for example to send object 200 a wake up signal, which will initiate signal transmission from object 200 as discussed below.

Transceiver 104 embodies a transmitter, a receiver, and a synthesizer. The transmitter includes a modulator that takes baseband data and upconverts to the RF carrier frequency produced by the synthesizer and an amplifier that amplifies the transmit signal. The controller 106 provides the modulator with the signals necessary to transmit information in the proper protocol intended for the proper recipient. The transmit amplifier may include power control to reduce power consumption when the range to transmit is short. The receiver includes filtering and amplification needed to receive RF signals and a demodulator that extracts the baseband signals from the received RF signals. The controller works with the demodulator to extract data only intended for this unit as per the transmitted protocol. All other received data is ignored.

One of the features of the illustrated embodiment of the present invention is to properly and reliably report direction in noisy RF environments or in places where many users are using the same or similar devices. The present invention employs a Zigbee protocol with additional information common to the direction-finding device and remote object that helps mark the information sent between the devices as unique to a particular user. The Zigbee protocol has methods for working in a noisy, multiuser environment, and the software that runs on both devices contains additional levels of security to ensure that the received signal strength is only that from signals received from the other device in the pair and not any other user's device or other noise source. Any protocol or methods commonly available can be used to enhance operation in a noisy, multiuser environment, helping to ensure signal strength is from intended transmitters.

Received signal strength indicator (RSSI) 105 coupled to controller 106 is a received signal strength indicator circuit to measure the received radio signal strength (energy integral, not the quality) detected by transceiver 104 from antennas 101 and 102 as they are multiplexed by switch 103. RSSI 105 may be implemented as an IF stage or in a zero-IF system, it may be implemented in the baseband signal chain, before a baseband amplifier. RSSI output may be provided as a DC analog level or sampled by an internal analog to digital converter (ADC) and the resulting codes available directly or via a peripheral or internal processor bus.

RSSI circuit 105 only provides RSSI data for transmissions that are intended for this recipient. This is accomplished by only examining RSSI data while the desired transmitter is transmitting, by examining the IF energy of the demodulated output, or any other multi-user RSSI determining method. Any method commonly available now or in the future can be used to ensure the RSSI data is only from the intended transmitter. Use of any methods not described within this embodiment is still considered within the scope of intent of the current invention.

User indicator 107 is coupled to controller 106 to provide a display or feedback signal to the user to provide among other feedback signals an indication of direction of remote object 200 to the user. This feedback could be in the form of visual cues such as LEDs, audible cues such as tones or voice out of a speaker, or tactile cues such as vibration or tapping. User indicator 107 may also indicate general status of the system, including low battery warning. All circuits in device 100 are powered by a power source 108, which is typically a battery, but may include any type of power source now known or later devised including combinations of sources such as solar cells and rechargeable batteries.

Remote object 200 includes an omnidirectional antenna 201 as shown in FIG. 1 which is coupled to a radio frequency transceiver 202. Similar to device 100 the circuit in object 200 may also include a received signal strength indicator (RSSI) 203 for the purpose of lowering its transmit power when the direction-finding device is in close proximity. The received signal strength indication from RSSI 203 could also be used as part of the direction-finding algorithm be either the remote object 200 or by the direction-finding device 100. A controller and processor 204 similar to controller and processor 106 is coupled to transceiver 202 and RSSI 203 as with device 100. The option for a user indicator 205 coupled to controller 204 is contemplated. A power source 206 powers all circuitry as is the case with power source 108 in device 100. Power source 206 may also derive power from the object it is located in, such as a cigarette lighter adapter if located in an automobile.

Figure 5:
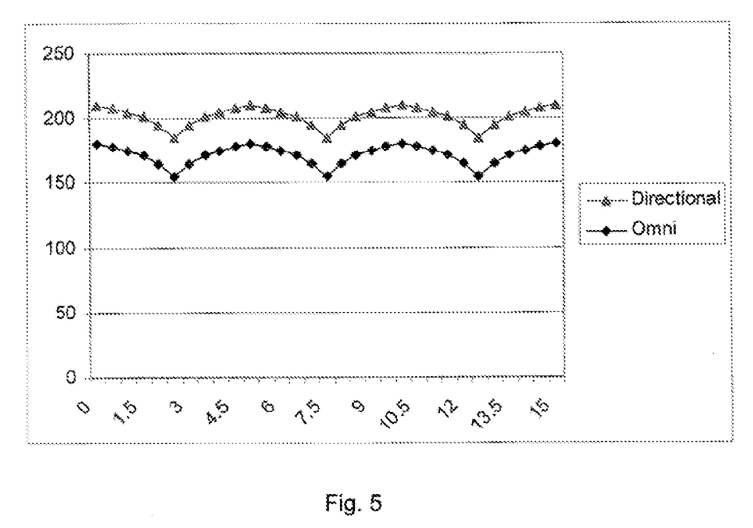
FIG. 5 is a graph of the received signal strengths as a function of left-right position of the directional-finding device, received by the directional and omnidirectional antennas when the directional-finding device is moved left and right while still maintaining a direction pointed towards the remote object.

The overall operation of system of FIG. 1 and the need antenna 101 and antenna 102 is illustrated in the idealized signal strength graphs of FIG. 5. FIG. 5 is a graph of the received signal strengths in arbitrary units of the directional antenna 101 shown by the triangular shaped data points compared to the received signal strengths in arbitrary units of the omnidirectional antenna 102 shown by the diamond shaped data points. Signal strength in FIG. 5 is with the direction-finding device 100 pointed towards the remote object 200 and is shown as a function of distance in arbitrary units as the direction-finding device 100 is moved from side to side through local peaks and nulls without varying its direction. Multiple maximums may be detected as graphically illustrated, but the signal strengths of the directional and omnidirectional antennas maintain the same delta across the graph. FIG. 5 shows the directional field strengths always greater than the omnidirectional field strengths, regardless of the absolute signal strength variations seen by moving through local peaks and nulls.

Figure 6:
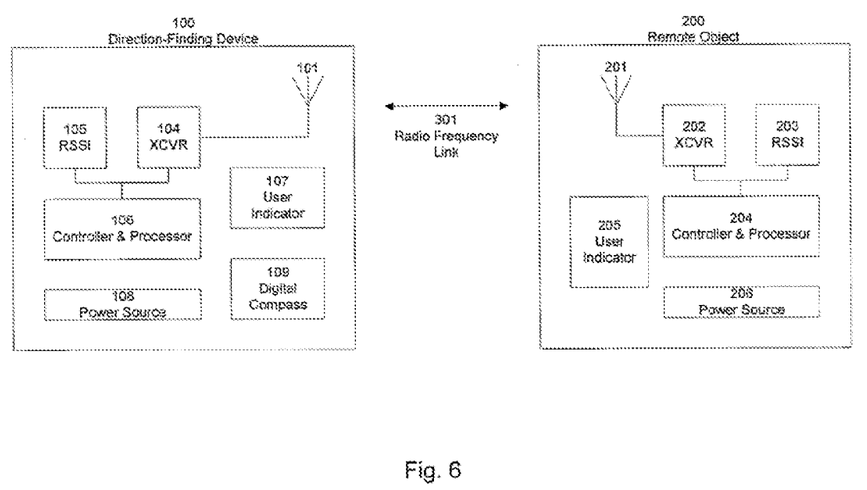
FIG. 6 is a block diagram of the circuitry in the direction finder and remote object according to the preferred embodiment of the present invention when a digital compass is incorporated.

FIG. 6 is a block diagram of the system when a digital compass 109 is included in device 100. Digital compass 109 generates signals corresponding to the magnetic or true compass directions, which is coupled to controller 106. In the embodiment of FIG. 6 omnidirectional antenna 102 and switch 103 are omitted. However, it must be understood that a compass 109 may also be included as a redundant element in the embodiment of FIG. 1 as well. Compass 109 allows controller 106 to collect data concerning the field strengths received by directional antenna 101 and to bin the data according to compass heading. Once collected in bins, captured data can be averaged or more intelligently used to present proper direction-finding feedback.

Figure 7:
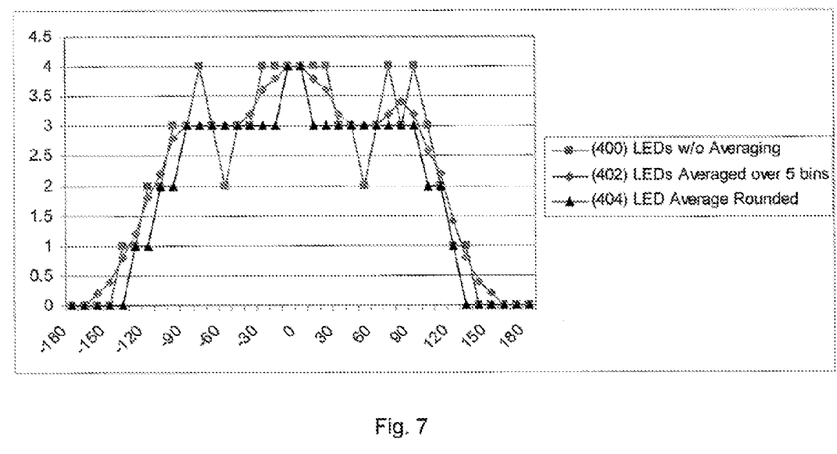
FIG. 7 is a graph of a typical received signal strength as a function of angle for both raw data and averaged data.

FIG. 7 is a graph illustrating the operation of the embodiment of FIG. 6. For this embodiment, consider the direction-finding device that includes a direction indication of four distinct LEDs. In this particular embodiment, all four LEDs are lit when the direction-finding device is pointed towards the remote object, and no LEDs are lit when the direction-finding device is essentially pointed away from the remote object. One, two, and three LEDs are lit indicating an orientation nearing the direction the remote object. The number of LEDs lit in the illustrated embodiment is binned into ten degree intervals centered beginning at zero degrees and extending to ±180°. Each interval or bin is defined as a "heading". North or 0° is taken for the purposes of illustration as the true target direction, which could arbitrarily be in any compass direction. FIG. 7 graphs a handheld sweep in curve 400, showing the number of LEDs lit as a function of sweep angle with no averaging included. The average of the data of graph 400, which takes the average of two headings on both sides of the selected heading together with the selected heading is shown by curve 402. Since most user interface elements quantize results before presenting to the user, this example shows the quantized number of LEDs that are lit in the data of graph 404. Note that while the data in graph 400 indicates best directionality at headings other than when pointing directly at the remote object, the data in graph 404 only indicates best directionality when pointing directly at the remote object. Thus, while the received field strengths by directional antenna 101 can be ambiguous when a single heading is viewed, the averages over multiple headings unambiguously indicates to the true target direction. It must be clearly understood that heading steps or interval widths, the number of headings required in the averages for reliable direction determination, and the incorporation of time averaging can be optimized for each embodiment or application without departing from the spirit and scope of the invention. In fact, multiple averaging algorithms can be sequentially run for a data sweep and a selection can then be made from the multiple averaging algorithms as to which one in any given data sweep or among multiple sweeps appears to be most reliable using automated decision logic.

Once the software running in the direction-finding device depicted in FIG. 6 has determined the heading that the remote object, feedback presented to the user could more clearly describe where the desired heading is relative to the current heading. For example, if the remote object is at a heading of 270° relative to the direction-finding device, and the direction-finding device is oriented towards a heading of 315°, software can calculate that the direction-finding device needs to be rotated 45° to the left. Depending on the sophistication of the user indication capability of the direction-finding device, it can report to the user "left," or "45° to the left." Alternatively, it could display some type of arrow or other direction-indicating device that indicates to the user that the remote object is located 45° to the left of where the direction-finding device is currently pointing. One example is a circle of LEDs arranged in a pattern representing an analog clock, where each LED in the circle corresponds to a half hour on the analog clock. In this arrangement there would be 24 LEDs making up the circle. In the example above where the remote object was located 45° to the left of the current heading, the LED corresponding to 10:30 on the analog clock would be lit, graphically representing the direction of the remote object.

Many alterations and modifications may be made by those having ordinary skill in the art without departing from the spirit and scope of the invention. Therefore, it must be understood that the illustrated embodiment has been set forth only for the purposes of one or a few examples and that it should not be taken as limiting the invention as defined by the following invention and its various embodiments. The various embodiments may be implemented in analog or digital circuitry, software or firmware controlled circuits well known to the art for receiving radio signals, digitizing and processing the radio signals to perform the various functions described in the claims below.

Therefore, it must be understood that the illustrated embodiment has been set forth only for the purposes of example and that it should not be taken as limiting the invention as defined by the following claims. For example, notwithstanding the fact that the elements of a claim are set forth below in a certain combination, it must be expressly understood that the invention includes other combinations of fewer, more or different elements, which are disclosed in above even when not initially claimed in such combinations. A teaching that two elements are combined in a claimed combination is further to be understood as also allowing for a claimed combination in which the two elements are not combined with each other, but may be used alone or combined in other combinations. The excision of any disclosed element of the invention is explicitly contemplated as within the scope of the invention.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. An apparatus for providing a determination of direction between an object and a user comprising:
 a first antenna having a first gain pattern;
 a second antenna having a second gain pattern different than the first gain pattern of the first antenna, the first and second antenna being situated at or near a first location associated with either the user or object;
 a third antenna for transmitting a location signal, the third antenna situated at a second location associated with the other one of either the user or object;
 a circuit coupled to the first antenna and second antenna to determine field strengths of the location signal received at the first and second antennas and to determine by comparison of the received location signal at the first and second antennas a probable relative direction between the user and the object,
 where the first and second antennas are included within a first direction finding device and further comprising a second direction finding device communicated to the first direction finding device so that the second direction finding device is arranged and configured to determine the relative probable direction of the first direction finding device.

2. The apparatus of claim 1 where the third antenna is used to transmit an omnidirectional signal.

3. The apparatus of claim 1 where the third antenna is used to transmit a directional signal according to a predetermined gain pattern.

4. The apparatus of claim 1 where the first antenna has a directional gain pattern, and where the second antenna has an omnidirectional gain pattern.

5. The apparatus of claim 1 where the first antenna has a first directional gain pattern, and where the second antenna has a second different directional gain pattern.

6. The apparatus of claim 1 where the circuit determines the probable relative direction by generation of a signal strength ratio of the signal strength received by the first antenna divided by the signal strength received by the second antenna.

7. The apparatus of claim 1 where the third antenna is associated with the object and the first and second antennas are associated with the user.

8. The apparatus of claim 1 where the third antenna is associated with the user and the first and second antennas are associated with the object, received signal strength indicator (RSSI) data and directional information being transmitted from the object to the user.

9. The apparatus of claim 1 where the circuit determines the probable relative direction between the user and the object when the signal strength received by the first antenna is at its relative maximum compared to other directions between the user and the object.

10. The apparatus of claim 1 where the circuit to determine a probable relative direction between the user and the object determines the probable relative direction by determining the ratio between the field strengths received by the first and second antennas from the third antenna as a function of direction of orientation of the first and second antennas.

11. The apparatus of claim 1 where the circuit to determine a probable relative direction between the user and the object determines the probable relative direction by determining the difference between the field strengths received by the first and second antennas from the third antenna as a function of direction of orientation of the first and second antennas.

12. The apparatus of claim 1 further comprising a circuit in the first direction finding device to indicate that the second direction finding device is in the process of determining the relative probable location of the first direction finding device.

13. The apparatus of claim 1 further comprising a circuit in the first direction finding device to block successful determination of the relative probable location of the first direction finding device by the second direction finding device.

14. The apparatus of claim 1 where the circuit to determine a probable relative direction between the user and the object determines the probable relative direction by determining a roll off rate of the received field strength as the direction of the first antenna is angularly varied to discriminate between directly received signals and indirectly received or reflected signals.

15. The apparatus of claim 1 further comprising a compass coupled to the circuit to allow for geographic headings corresponding to direction.

16. The apparatus of claim 15 where the circuit averages signal strength over a predetermined range of adjacent headings and assigns the average to each corresponding heading.

17. The apparatus of claim 15 where the relative probable direction is determined only after a predetermined sweep of headings is obtained.

18. The apparatus of claim 1 where the circuit to determine a probable relative direction between the user and the object determines a most favorable angular direction to orient the first antenna toward the probable relative direction.

19. The apparatus of claim 1 where the circuit determine a probable relative direction between the user and the object compares the received signals at the first and second antenna as the user moves the apparatus when pointed toward the object with the received signals at the first and second antenna when pointed away from the object.

20. A method for providing a determination of direction between an object and a user comprising:
  transmitting a location signal from a third antenna, the third antenna situated at a second location associated with the other one of either the user or object;
  receiving the location signal at a first antenna having a first gain pattern;
  receiving the location signal at a second antenna having a second gain pattern different than the first gain pattern of the first antenna, the first and second antenna being situated at or near a first location associated with either the user or object;
  determining field strengths of the location signal received;
  determining a probable relative direction between the user and the object by comparison of the received location signal at the first antenna and second antenna,
  where the first and second antennas are included within a first direction finding device and further comprising communicating a second direction finding device to the first direction finding device so that the second direction finding device determines the relative probable direction of the first direction finding device.

21. The method of claim 20 where transmitting a location signal from a third antenna comprises transmitting an omnidirectional signal.

22. The method of claim 20 where transmitting a location signal from a third antenna comprises transmitting a directional signal according to a predetermined gain pattern.

23. The method of claim 20 where receiving the location signal a first antenna comprises receiving the location signal according to a directional gain pattern, and where receiving the location signal a second antenna comprises receiving the location signal according to an omnidirectional gain pattern.

24. The method of claim 20 where receiving the location signal a first antenna comprises receiving the location signal according to a first directional gain pattern, and where receiving the location signal at a second antenna comprises receiving the location signal according to a second different directional gain pattern.

25. The method of claim 20 where determining a probable relative direction between the user and the object comprises generating a signal strength ratio of the signal strength received by the first antenna divided by the signal strength received by the second antenna.

26. The method of claim 20 where the third antenna is associated with the user and the first and second antennas are associated with the object, and further comprising transmitting received signal strength indicator (RSSI) data and directional information from the object to the user.

27. The method of claim 20 where determining a probable relative direction between the user and the object comprises determining the probable relative direction between the user and the object when the signal strength received by the first antenna is at its relative maximum compared to other directions between the user and the object.

28. The method of claim 20 where determining a probable relative direction between the user and the object comprises determining the ratio between the field strengths received by the first and second antennas from the third antenna as a function of direction of orientation of the first and second antennas.

29. The method of claim 20 where determining a probable relative direction between the user and the object comprises determining the probable relative direction by determining the difference between the field strengths received by the first and second antennas from the third antenna as a function of direction of orientation of the first and second antennas.

30. The method of claim 20 further comprising indicating in the first direction finding device that the second direction finding device is in the process of determining the relative probable location of the first direction finding device.

31. The method of claim 20 further comprising blocking successful determination of the relative probable location of the first direction finding device by the second direction finding device.

32. The method of claim 20 where determining a probable relative direction between the user and the object comprises determining a roll off rate of the received field strength as the direction of the first antenna is angularly varied to discriminate between directly received signals and indirectly received or reflected signals.

33. The method of claim 20 further comprising generating geographic headings corresponding to direction.

34. The method of claim 33 where generating geographic headings corresponding to direction comprises averaging signal strength over a predetermined range of adjacent headings and assigns the average to each corresponding heading.

35. The method of claim 33 where generating geographic headings corresponding to direction comprises determining the relative probable direction only after a predetermined sweep of headings is obtained.

36. The method of claim 20 further comprising determining a most favorable angular direction to orient the first antenna toward the probable relative direction.

37. The method of claim 20 where determining a probable relative direction between the user and the object comprises comparing the received signals at the first and second antenna when pointed toward the object with the received signals at the first and second antenna when pointed away from the object.

* * * * *